United States Patent
Ikarashi et al.

(10) Patent No.: US 11,886,876 B2
(45) Date of Patent: Jan. 30, 2024

(54) SECURE STRONG MAPPING COMPUTING SYSTEMS, METHODS, SECURE COMPUTING APPARATUS AND PROGRAM

(71) Applicant: NIPPON TELEGRAPH AND TELEPHONE CORPORATION, Tokyo (JP)

(72) Inventors: Dai Ikarashi, Musashino (JP); Koki Hamada, Musashino (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 341 days.

(21) Appl. No.: 17/267,813

(22) PCT Filed: Aug. 8, 2019

(86) PCT No.: PCT/JP2019/031475
§ 371 (c)(1),
(2) Date: Feb. 11, 2021

(87) PCT Pub. No.: WO2020/036125
PCT Pub. Date: Feb. 20, 2020

(65) Prior Publication Data
US 2021/0182062 A1 Jun. 17, 2021

(30) Foreign Application Priority Data
Aug. 13, 2018 (JP) .................... 2018-152411

(51) Int. Cl.
*G06F 9/30* (2018.01)
*G06F 9/38* (2018.01)
*H04L 9/08* (2006.01)

(52) U.S. Cl.
CPC ........ *G06F 9/30036* (2013.01); *G06F 9/3001* (2013.01); *G06F 9/3836* (2013.01); *H04L 9/085* (2013.01)

(58) Field of Classification Search
None
See application file for complete search history.

(56) References Cited

U.S. PATENT DOCUMENTS

2019/0228010 A1 7/2019 Ikarashi et al.

FOREIGN PATENT DOCUMENTS

| JP | 2012-154968 A | 8/2012 |
|---|---|---|
| JP | 2013-157652 A | 8/2013 |

(Continued)

OTHER PUBLICATIONS

Koki Hamada, Ryo Kikuchi, Dai Ikarashi, Koji Chida, and Katsumi Takahashi; Practically Efficient Multi-party Sorting Protocols from Comparison Sort Algorithms; 202-216 (Year: 2012).*

(Continued)

*Primary Examiner* — Saleh Najjar
*Assistant Examiner* — Shadi H Kobrosli
(74) *Attorney, Agent, or Firm* — XSENSUS LLP

(57) ABSTRACT

A secure strong mapping computing system is a secure joining system including a plurality of secure computing apparatuses. The plurality of secure computing apparatuses include a first vector joining unit $11_n$, a first permutation calculation unit $12_n$, a first vector generation unit $13_n$, a second vector joining unit $14_n$, a first permutation application unit $15_n$, a second vector generation unit $16_n$, a first inverse permutation application unit $17_n$, and a first vector extraction unit $18_n$.

8 Claims, 9 Drawing Sheets

(56) References Cited

FOREIGN PATENT DOCUMENTS

| JP | 2013157652 A | * | 8/2013 |
| JP | 5486520 B2 | * | 5/2014 |
| WO | 2018061800 A1 | | 4/2018 |

OTHER PUBLICATIONS

Dai Ikarashi, Koji Chida, Koki Hamada, Katsumi Takashashi (Secure Database Operations Using An Improved 3-party Verifiable Secure Function Evaluation; 1-16 (Year: 2011).*

Satoshi Hasegawa, et al., "Privacy Preserving Fisher's Exact Test for GWAS", IPSJ SIG Technical Report, Security Psychology & Trust (SPT), vol. 2016-SPT-19, No. 39, Jul. 7, 2016 (Jul. 7, 2016), pp. 1-8, XP009525702 (with machine-generated English translation), 16 pages.

Karashi et al., "We haven't Found the Most Important Thing ;- Designs and Implementations of Secure Outer-join Protocols", Computer Security Symposium, vol. 2018, No. 2, Oct. 22-25, 2018, pp. 1221-1228. (12 pages of English Translation).

Hamada et al., "A Batch Mapping Algorithm for Secure Function Evaluation", The transactions of the Institute of Electronics, Information and Communication Engineers, vol. J96-A, No. 4, pp. 157-165 (12 pages of English Translation).

* cited by examiner

SECURE STRONG MAPPING COMPUTING SYSTEMS, METHODS, SECURE COMPUTING APPARATUS AND PROGRAM

CROSS-REFERENCE TO RELATED APPLICATIONS

The present application is based on PCT filing PCT/JP2019/031475, filed Aug. 8, 2019, which claims priority to JP 2018-152411, filed Aug. 13, 2018, the entire contents of each are incorporated herein by reference.

TECHNICAL FIELD

The present invention relates to techniques for computing mapping in secure computation.

BACKGROUND ART

A mapping protocol described in Non-Patent Literature 1 is known as a conventional technique for mapping computation.

Prior Art Literature

Non-Patent Literature

Non-Patent Literature 1: Koki Hamada, Dai Ikarashi, and Koji Chida, "A Batch Mapping Algorithm for Secure Function Evaluation", The transactions of the Institute of Electronics, Information and Communication Engineers, Vol. J96-A, No. 4, pp. 157-165

SUMMARY OF THE INVENTION

Problems to be Solved by the Invention

The conventional mapping protocol, however, cannot detect outliers because a domain of definition is intervals (such as [1, 3]→1, [4, 8]→5, [9, 10]→2; there is no gap in the domain of definition).

The present invention is aimed at providing a secure strong mapping computing system, methods, a secure computing apparatus, and a program that can perform mapping computation while detecting outliers.

Means to Solve the Problems

A secure strong mapping computing system according to an aspect of the present invention is a secure joining system including a plurality of secure computing apparatuses, where $F_k$ and $F_v$ are arbitrary rings; $[\alpha]$ is a share generated by secret sharing of $\alpha$, with $\alpha$ being an arbitrary vector or permutation; m and n are predetermined integers greater than or equal to 1; u is a predetermined value; $r \in F_k^m$ is a predetermined vector with elements different from each other; and $d \in F_v^m$ and $x \in F_k^n$ are predetermined vectors. The plurality of secure computing apparatuses include: a plurality of first vector joining units that use a share $[r]$ of the vector r and a share $[x]$ of the vector x to generate a share $[k]$ of a vector $k \in [F_k]^{2m+n}$ which is generated by joining the vector r, the vector x, and the same vector as the vector r; a plurality of first permutation calculation units that use the share $[k]$ to generate a share $[\sigma]$ of a permutation $\sigma$ for stable sorting of the vector k; a plurality of first vector generation units that use a share $[d]$ of the vector d and u to generate a share $[d']$ of a vector d', which is a vector generated by subtracting u from respective elements of the vector d; a plurality of second vector joining units that use the share $[d']$ to generate a share $[v]$ of a vector $v \in [F_v]^{2m+n}$ which is generated by joining the vector d', a 0-vector with a number of elements of n, and a vector $-d'$ which is a vector generated by inverting signs of respective elements of the vector d'; a plurality of first permutation application units that use the share $[v]$ and the share $[\sigma]$ to generate a share $[\sigma(v)]$ of a vector $\sigma(v)$ which is generated by application of the permutation $\sigma$ to the vector v; a plurality of second vector generation units that use the share $[\sigma(v)]$ to generate a share $[\sigma(y)]$ of a vector $\sigma(y)$, each element of which is a sum of the u and a sum of elements of the vector $\sigma(v)$ up to an element corresponding to that element, the elements including the element corresponding to that element; a plurality of first inverse permutation application units that use the share $[\sigma(y)]$ and the share $[\sigma]$ to generate a share $[\sigma^{-1}(\sigma(y))]$ of a vector $\sigma^{-1}(\sigma(y))$ which is generated by application of an inverse permutation $\sigma^{-1}$ of the permutation $\sigma$ to the vector $\sigma(y)$; and a plurality of first vector extraction units that use the share $[\sigma^{-1}(\sigma(y))]$ to obtain a share $[y]$ of a vector y which is generated by extracting m+1th to m+nth elements of the vector $\sigma^{-1}(\sigma(y))$.

Effects of the Invention

Mapping computation can be performed while detecting outliers.

DETAILED DESCRIPTION OF THE EMBODIMENTS

Figure 1:
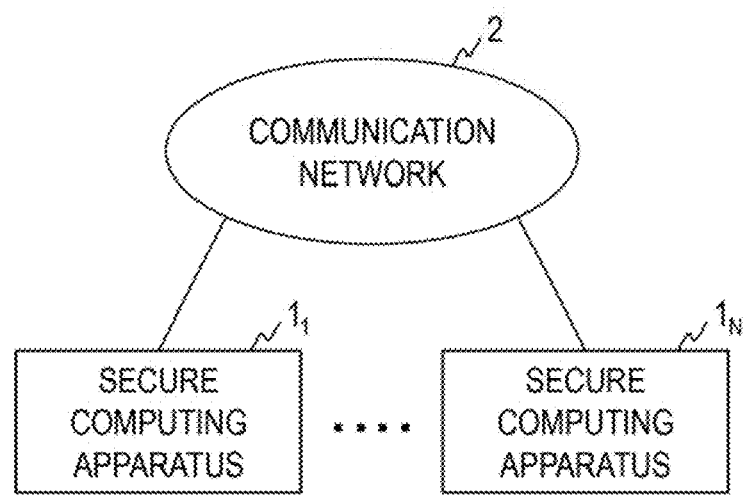
FIG. 1 illustrates a functional configuration of a secure strong mapping computing system and a secure joining system.

Embodiments of the present invention are described below in detail. In the drawings, components having the same function are given the same reference characters and overlapping description is omitted.

[Secure Strong Mapping Computing System and Method]

Referring to FIG. 1, an exemplary configuration of a secure strong mapping computing system according to an embodiment is described. The secure strong mapping computing system includes N (≥2) secure computing apparatuses $1_1, \ldots, 1_N$. In this embodiment, the secure computing apparatuses $1_1, \ldots, 1_N$ are each connected to a communication network 2. The communication network 2 is a circuit-switched or packet-switched communication network configured to allow communications between connected apparatuses, and can be the Internet, a local area network (LAN), a wide area network (WAN), and the like, for example. The apparatuses do not necessarily be capable of communicating online via the communication network 2. For example, they may be configured such that information entered to the secure computing apparatuses $1_1, \ldots, 1_N$ is stored in a portable recording medium such as magnetic tape or a USB memory and the information is entered offline to the secure computing apparatuses $1_1, \ldots, 1_N$ from the portable recording medium.

Figure 2:
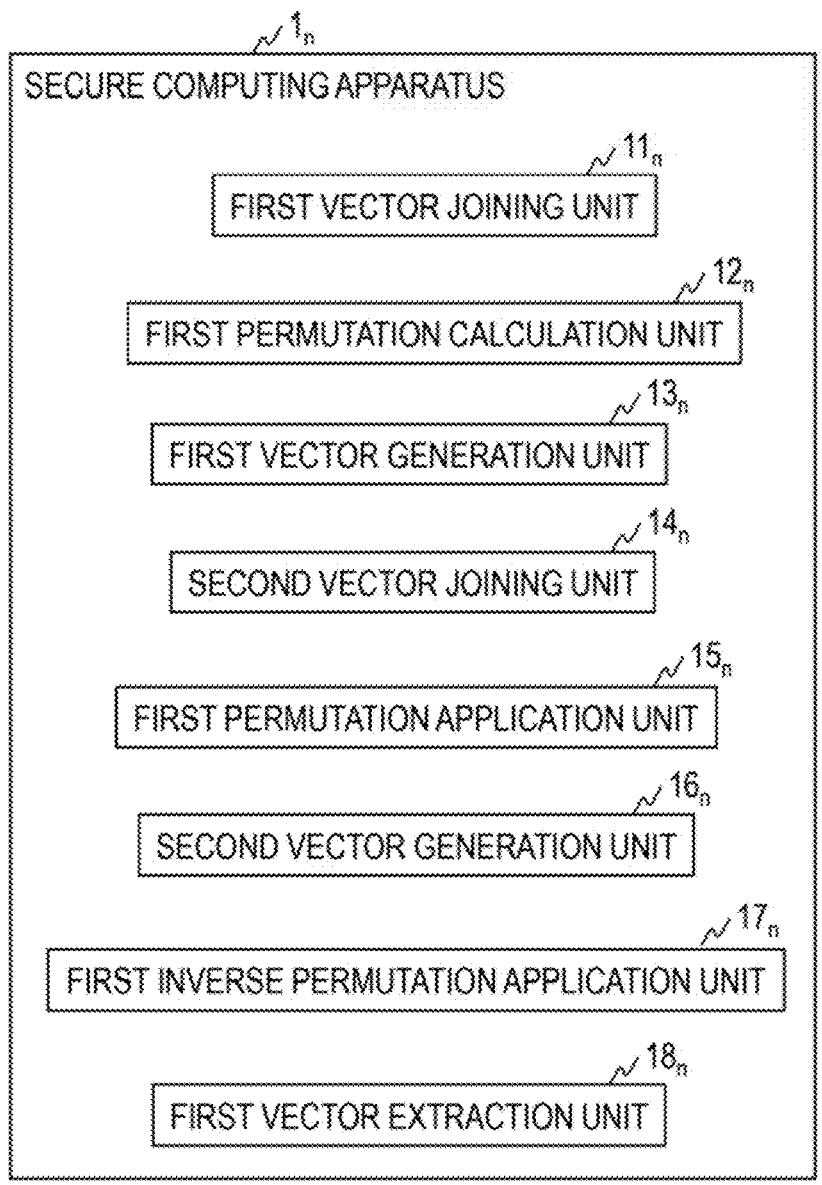
FIG. 2 illustrates a functional configuration of a secure computing apparatus for secure strong mapping computation system.

Referring to FIG. 2, an exemplary configuration of a secure computing apparatus $1_n$ (n=1, ..., N) included in the secure strong mapping computing system is described. As shown in FIG. 2, the secure computing apparatus $1_n$ of the secure strong mapping computing system includes a first vector joining unit $11_n$, a first permutation calculation unit $12_n$, a first vector generation unit $13_n$, a second vector joining unit $14_n$, a first permutation application unit $15_n$, a second vector generation unit $16_n$, a first inverse permutation application unit $17_n$, and a first vector extraction unit $18_n$, for example.

By the components of the secure computing apparatus $1_n$ ($1 \leq n \leq N$) performing processing at each step described later in cooperation with the components of other secure computing apparatus $1_{n'}$ (n'=1, ..., N; where n≠n'), a secure strong mapping computing method according to an embodiment is implemented.

The processing at each step is performed in secure computation. That is, the secure computing apparatus $1_n$ performs the processing at each step without reconstructing a share, in other words, without knowing the content of the share.

The secure computing apparatus $1_n$ is a special apparatus configured by loading of a special program into a well-known or dedicated computer having a central processing unit (CPU), main storage unit (random access memory: RAM), and the like, for example. The secure computing apparatus $1_n$ executes various kinds of processing under control of the central processing unit, for example. Data input to the secure computing apparatus $1_n$ and data resulting from processing are stored in the main storage unit, for example, and the data stored in the main storage unit is read into the central processing unit as necessary to be used for other processing. The components of the secure computing apparatus $1_n$ may at least partially consist of hardware such as an integrated circuit.

For the following description, $[\alpha]$ is assumed to be a share generated by secret sharing of $\alpha$, with $\alpha$ being an arbitrary vector or an arbitrary permutation.

Figure 3:
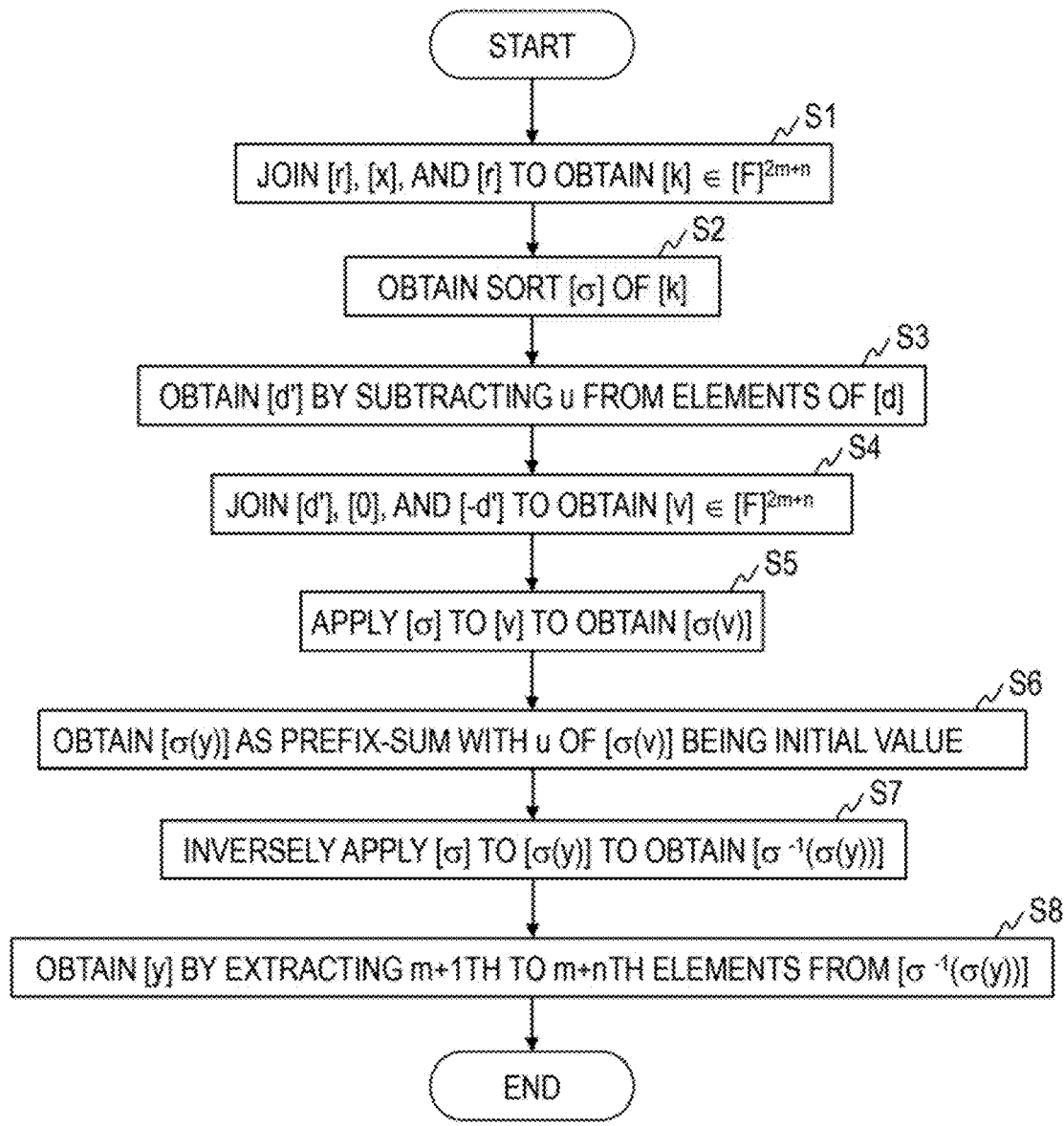
FIG. 3 illustrates a processing procedure of a secure strong mapping computing method.

Referring to FIG. 3, the processing procedure of the secure strong mapping computing method which is performed by the secure joining system in the embodiment is described.

The secure strong mapping computing system and method are for computing a vector y which is output when a mapping defined by a vector $r \in F_k^m$ corresponding to the domain of definition, a vector $d \in F_v^m$ corresponding to a range, and an outlier u is applied to a vector x corresponding to input. m and n are predetermined integers greater than or equal to 1, the outlier u is a predetermined value, $r \in F_k^m$ is a predetermined vector with elements different from each other, and $d \in F_v^m$ and $x \in F_k^n$ are predetermined vectors.

When $r_i$ is the ith element of the vector r, $d_i$ is the ith element of the vector d, $x_i$ is the ith element of the vector x, and $y_i$ is the ith element of the vector y, this mapping is a mapping that assumes $y_i = d_j$ when j with $x_i = r_j$ exists and assumes $y_i = u$ when j with $x_i = r_j$ does not exist.

For example, in the case of the vector r=(1, 3, 2), the vector d=(2, 5, 1), u=−1, and the vector x=(1, 0, 2, 5, 3), application of the mapping to the vector x=(1, 0, 2, 5, 3) gives a vector: the vector y=(2, −1, 1, −1, 5).

<Step S1>

A share [r] of the vector r and a share [x] of the vector x are input to the first vector joining units $11_1, \ldots, 11_N$.

The first vector joining units $11_1, \ldots, 11_N$ each generate a share [k] of a vector $k \in [F_k]^{2m+n}$ which is generated by joining the vector r, the vector x, and the same vector as the vector r (step S1).

The generated share [k] is output to the first permutation calculation units $12_1, \ldots, 12_N$.

For example, assume that the vector r=(1, 3, 2) and the vector x=(1, 0, 2, 5, 3) hold. Then, the vector k=(1, 3, 2, 1, 0, 2, 5, 3, 1, 3, 2) is yielded.

<Step S2>

The share [k] is input to the first permutation calculation units $12_1, \ldots, 12_N$.

The first permutation calculation units $12_1, \ldots, 12_N$ each use the share [k] to generate a share $[\sigma]$ of a permutation $\sigma$ for stable sorting of the vector k (step S2).

The share $[\sigma]$ is output to the first vector generation units $13_1, \ldots, 13_N$.

For example, the permutation $\sigma$=(4, 0, 3, 8, 2, 5, 10, 1, 7, 9, 6) is yielded when the vector k=(1, 3, 2, 1, 0, 2, 5, 3, 1, 3, 2).

Generation of the share $[\sigma]$ of the permutation $\sigma$ for performing a stable sort can be implemented with the approach of Reference Literature 1, for example.

[Reference Literature 1] Dai Ikarashi, Koki Hamada, Ryo Kikuchi, and Koji Chida, "A Design and an Implementation of Super-high-speed Multi-party Sorting: The Day When Multi-party Computation Reaches Scripting Languages", CSS2017, 2017

<Step S3>

A share [d] of the vector d and u are input to the first vector generation units $13_1, \ldots, 13_N$.

The first vector generation units $13_1, \ldots, 13_N$ each use the share [d] and u to generate a share [d'] of a vector d', which is a vector generated by subtracting u from the respective elements of the vector d (step S3).

The share [d'] is output to the second vector joining units $14_1, \ldots, 14_N$.

For example, the vector d'=(3, 6, 2) is yielded when the vector d=(2, 5, 1) and u=−1.

<Step S4>

The share [d'] is input to the second vector joining units $14_1, \ldots, 14_N$.

The second vector joining units $14_1, \ldots, 14_N$ each use the share [d'] to generate a share [v] of a vector $v \in [F_v]^{2m+n}$ which is generated by joining the vector d', a 0-vector with a number of elements of n, and a vector −d' which is a vector generated by inverting the signs of the respective elements of the vector d' (step S4).

The share [v] is output to the first permutation application units $15_1, \ldots, 15_N$.

For example, the vector v=(3, 6, 2, 0, 0, 0, 0, 0, −3, −6, −2) is yielded when the vector d'=(3, 6, 2) and n=5.

<Step S5>

The share [v] and the share $[\sigma]$ are input to the first permutation application units $15_1, \ldots, 15_N$.

The first permutation application units $15_1, \ldots, 15_N$ each use the share [v] and the share [σ] to generate a share [σ(v)] of a vector σ(v) which is generated by application of the permutation σ to the vector v (step S5).

The share [σ(v)] is output to the second vector generation units $16_1, \ldots, 16_N$.

For example, the vector σ(v)=(0, 3, 0, −3, 2, 0, −2, 6, 0, −6, 0) is yielded when the permutation σ=(4, 0, 3, 8, 2, 5, 10, 1, 7, 9, 6) and the vector v=(3, 6, 2, 0, 0, 0, 0, 0, −3, −6, −2).

<Step S6>

The share [σ(v)] is input to the second vector generation units $16_1, \ldots, 16_N$.

The second vector generation units $16_1, \ldots, 16_N$ each use the share [σ(v)] to generate a share [σ(y)] of a vector σ(y), each element of which is the sum of u and the sum of the elements of the vector σ(v) up to the element corresponding to that element, the elements including the element corresponding to that element (step S6). In other words, the second vector generation units $16_1, \ldots, 16_N$ calculate the prefix-sum of the vector σ(v) with the initial value being u, as σ(y). When σ(v)$_i$ is the ith element of σ(v) and σ(y)$_i$ is the ith element of σ(y), $\sigma(y)_i = u + \sum_{j=1}^{i} \sigma(v)_j$ is yielded.

The share [σ(y)] is output to the first inverse permutation application units $17_1, \ldots, 17_N$.

For example, the vector σ(y)=(−1, 2, 2, −1, 1, 1, −1, 5, 5, −1, −1) is yielded when the vector σ(v)=(0, 3, 0, −3, 2, 0, −2, 6, 0, −6, 0).

<Step S7>

The share [σ(y)] and the share [σ] are input to the first inverse permutation application units $17_1, \ldots, 17_N$.

The first inverse permutation application units $17_1, \ldots, 17_N$ each use the share [σ(y)] and the share [σ] to generate a share [σ$^{-1}$(σ(y))] of a vector σ$^{-1}$(σ(y)) which is generated by application of an inverse permutation σ$^{-1}$ of the permutation σ to the vector σ(y) (step S7).

The share [σ$^{-1}$(σ(y))] is output to the first vector extraction units $18_1, \ldots, 18_N$.

For example, the vector σ$^{-1}$(σ(y))=(2, 5, 1, 2, −1, 1, −1, 5, −1, −1, −1) is yielded when the permutation σ=(4, 0, 3, 8, 2, 5, 10, 1, 7, 9, 6) and the vector σ(y)=(−1, 2, 2, −1, 1, 1, −1, 5, 5, −1, −1).

<Step S8>

The share [σ$^{-1}$(σ(y))] is input to the first vector extraction units $18_1, \ldots, 18_N$.

The first vector extraction units $18_1, \ldots, 18_N$ each use the share [σ$^{-1}$(σ(y))] to obtain a share [y] of the vector y which is generated by extracting the m+1th to the m+nth elements of the vector σ$^{-1}$(σ(y)) (step S8).

For example, the vector y=(2, −1, 1, −1, 5) is yielded when the vector σ$^{-1}$(σ(y))=(2, 5, 1, 2, −1, 1, −1, 5, −1, −1, −1).

The vector y=(2, −1, 1, −1, 5) represents a vector that is output when applying the mapping with the vector r=(1, 3, 2), the vector d=(2, 5, 1), u=−1, and the vector x=(1, 0, 2, 5, 3) to the vector x=(1, 0, 2, 5, 3). The first element "1", third element "2", and the fifth element "3" of the vector x=(1, 0, 2, 5, 3) have been mapped to the first element "2", the third element "1", and the fifth element "5" of the vector y=(2, −1, 1, −1, 5), respectively, via the mapping. Also, the second element "0" and the fourth element "5" of the vector x=(1, 0, 2, 5, 3) have been mapped to the outlier "−1" via the mapping because they are values that do not exist in the elements of the vector r, which corresponds to the domain of definition.

In this manner, mapping computation can be performed while detecting outliers with the secure strong mapping computing system and method.

In the following, embodiments of the secure joining system and method using the secure strong mapping computing system and method are described.

[Secure Joining System and Method for Performing Left Outer Join]

Referring to FIG. 1, an exemplary configuration of a secure joining system according to an embodiment is described. This secure joining system and method performs so-called left outer join. Left outer join is discussed later.

The secure joining system includes N (≥2) secure computing apparatuses $1_1, \ldots, 1_N$ as with the secure strong mapping computing system. In this embodiment, the secure computing apparatuses $1_1, \ldots, 1_N$ are each connected to the communication network 2. The communication network 2 is a circuit-switched or packet-switched communication network configured to allow communications between connected apparatuses, and can be the Internet, a local area network (LAN), a wide area network (WAN), and the like, for example. The apparatuses do not necessarily be capable of communicating online via the communication network 2. For example, they may be configured such that information entered to the secure computing apparatuses $1_1, \ldots, 1_N$ is stored in a portable recording medium such as magnetic tape or a USB memory and the information is entered offline to the secure computing apparatuses $1_1, \ldots, 1_N$ from the portable recording medium.

Figure 4:
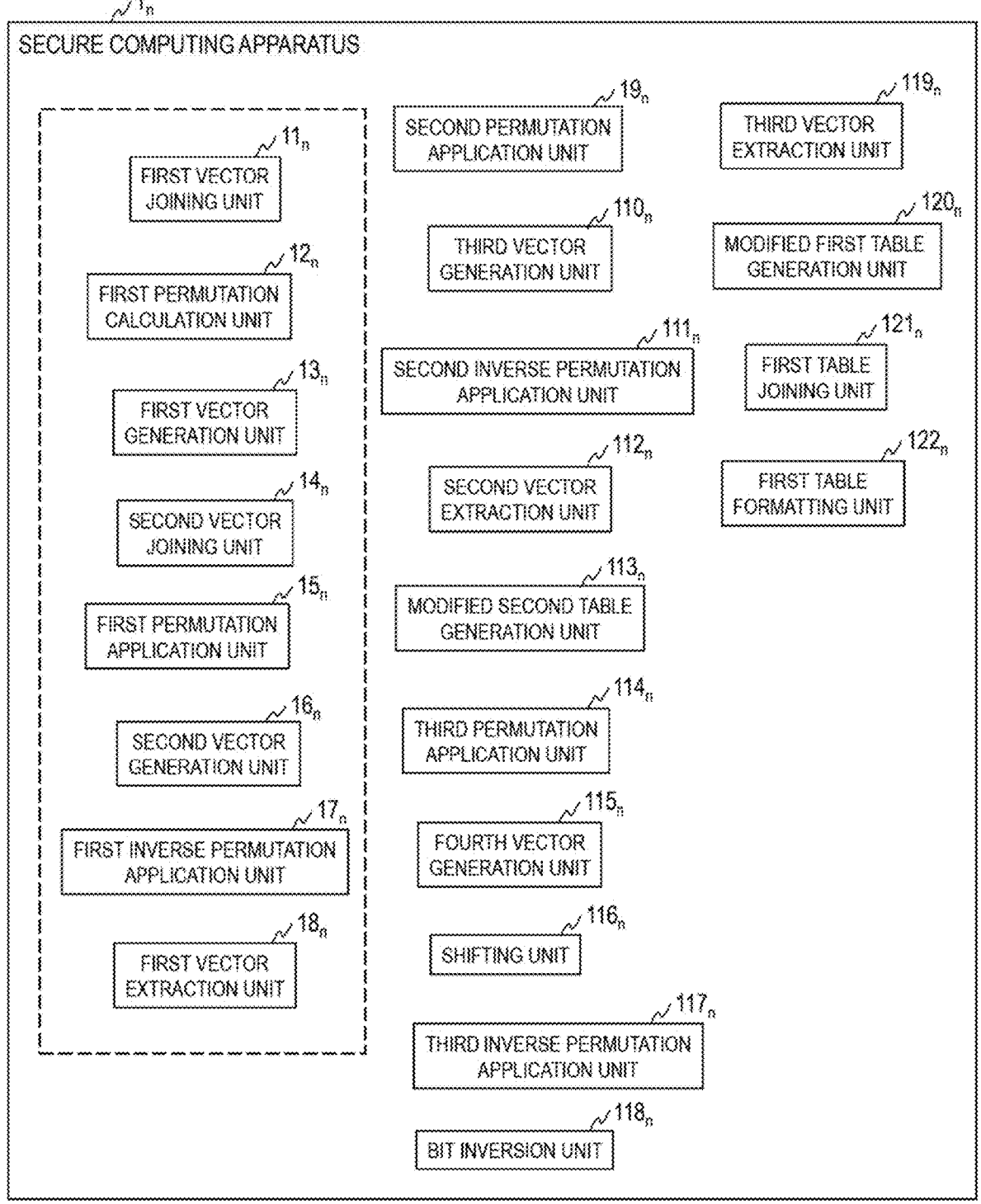
FIG. 4 illustrates a functional configuration of a secure computing apparatus of a secure joining system for performing left outer join.

Referring to FIG. 4, an exemplary configuration of a secure computing apparatus $1_n$ (n=1, ..., N) included in the secure joining system is described. As shown in FIG. 4, the secure computing apparatus $1_n$ of the secure joining system includes the first vector joining unit $11_n$, the first permutation calculation unit $12_n$, the first vector generation unit $13_n$, the second vector joining unit $14_n$, the first permutation application unit $15_n$, the second vector generation unit $16_n$, the first inverse permutation application unit $17_n$, the first vector extraction unit $18_n$, a second permutation application unit $19_n$, a third vector generation unit $110_n$, a second inverse permutation application unit $111_n$, a second vector extraction unit $112_n$, a modified second table generation unit $113_n$, a third permutation application unit $114_n$, a fourth vector generation unit $115_n$, a shifting unit $116_n$, a third inverse permutation application unit $117_n$, a bit inversion unit $118_n$, a third vector extraction unit $119_n$, a modified first table generation unit $120_n$, a first table joining unit $121_n$, and a first table formatting unit $122_n$, for example.

The first vector joining unit $11_n$, the first permutation calculation unit $12_n$, the first vector generation unit $13_n$, the second vector joining unit $14_n$, the first permutation application unit $15_n$, the second vector generation unit $16_n$, the first inverse permutation application unit $17_n$, and the first vector extraction unit $18_n$ of the secure computing apparatus $1_n$, which are enclosed by dashed line in FIG. 4, can be said to be a portion corresponding to the secure strong mapping computing system.

By the components of the secure computing apparatus $1_n$ (1≤n≤N) performing processing at each step described later in cooperation with the components of other secure computing apparatus $1_{n'}$ (n'=1, ..., N; where n≠n'), a secure joining method according to an embodiment is implemented.

The processing at each step is performed in secure computation. That is, the secure computing apparatus $1_n$ performs the processing at each step without reconstructing a share, in other words, without knowing the content of the share.

The secure computing apparatus $1_n$ is a special apparatus configured by loading of a special program into a well-known or dedicated computer having a central processing unit (CPU), main storage unit (random access memory: RAM), and the like, for example. The secure computing apparatus $1_n$ executes various kinds of processing under control of the central processing unit, for example. Data input to the secure computing apparatus $1_n$ and data resulting from processing are stored in the main storage unit, for example, and the data stored in the main storage unit is read into the central processing unit as necessary to be used for other processing. The components of the secure computing apparatus $1_n$ may at least partially consist of hardware such as an integrated circuit.

Figure 5:
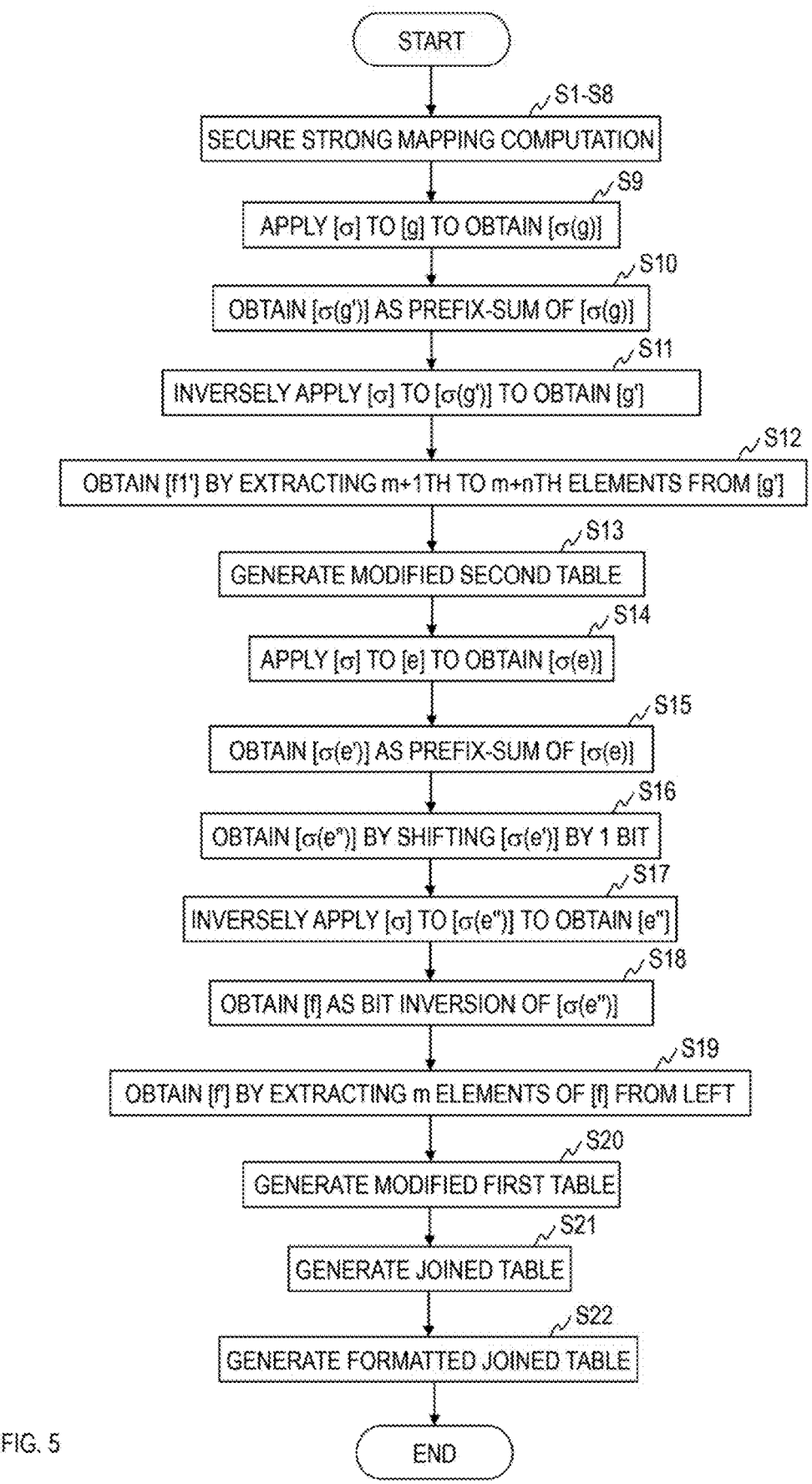
FIG. 5 illustrates a processing procedure of a secure joining method for performing left outer join.

Referring to FIG. 5, the processing procedure of the secure joining method which is performed by the secure joining system in the embodiment is described.

The secure joining system described below performs left outer join of a first table and a second table. In other words, the secure joining system described below joins records that are common to the first table and the second table with records that exist only in the first table while maintaining confidentiality.

Assume that m, n, $L_1$, and $L_2$ are integers greater than or equal to 1. m, n, $L_1$, and $L_2$ may be the same value or different values.

The first table has in records. Each one of the in records has one key and attribute values of $L_1$ attributes. Let $k_1 \in F_k^m$ be a vector of the keys of the first table. It is assumed that there are no overlapping keys in the first table.

The second table has n records. Each one of the n records has one key and attribute values of $L_2$ attributes. Let $k_2 \in F_k^n$ be a vector of the keys of the second table. It is assumed that overlapping keys are permitted in the second table.

For example, assume that the first table has three records and consists of a vector of keys, $k_1=(3, 5, 9)$, and a vector of the attribute values of one attribute $v_1$, $v_1=(100, 19, 85)$.

Also assume that the second table has four records and consists of a vector of keys, $k_2=(3, 7, 9, 9)$, and a vector of the attribute values of one attribute $v_2$, $v_2=$(water, mix au lait, drug, water).

In a case where the first table contains the attribute values of multiple attributes, $v_1$ may be a vector which is a concatenation of the attribute values of the multiple attributes. For example, assume that the first table has two records and contains the attribute values of two attributes, where the vector of the attribute values of the first attribute is $v_{1,1}=(29, 169)$ and the vector of the attribute values of the second attribute is $v_{1,1}=(35, 175)$. In this case, $v_1$ may be the vector $v_1=((29, 35), (169, 175))$, which is a concatenation of the attribute values of these two attributes.

Similarly, in a case where the second table contains the attribute values of multiple attributes, $v_2$ may be a vector which is a concatenation of the attribute values of the multiple attributes.

Since in general a vector with its elements being rings is also a ring, data formed by arranging the values of the respective attributes contained in a record can be considered to be a vector, that is, a ring.

First, with processing at the <step S1> to <step S8> of the secure strong mapping computing system and method described above, the vector y that is output when a mapping defined by r, d, and u is applied to x is calculated, where the vector corresponding to the domain of definition is the vector $r=k_1$, the vector corresponding to the range is the vector $d=v_1$, and the vector corresponding to input is the vector $x=k_2$. This results in the attribute values of the attribute $v_1$ of the first table that correspond to the records of the second table. An attribute value corresponding to a record which is a record of the second table and which corresponds to a key that does not exist in the first table will be the outlier u.

As the processing at <step S1> to <step S8> is similar of the processing at <step S1> to <step S8> described in Section [Secure strong mapping computing system and method], overlapping description is not repeated here.

For example, in the case of the vector $r=k_1=(3, 5, 9)$, the vector $d=v_1=(100, 19, 85)$, $u=-1$, and $x=k_2=(3, 7, 9, 9)$, application of the mapping to the vector $x=(3, 7, 9, 9)$ gives a vector: the vector $y=(100, -1, 85, 85)$. Since the second element "7" of the vector $x=k_2=(3, 7, 9, 9)$ does not exist in the elements of the vector $r=k_1=(3, 5, 9)$, the second element of the vector $y=(100, -1, 85, 85)$ is the outlier $u=-1$. In this manner, the vector y is calculated such that an attribute value corresponding to a record which is a record of the second table and which corresponds to a key that does not exist in the first table will be the outlier u.

<Step S9>

To the second permutation application units $19_1, \ldots, 19_N$, a share [g] of a vector $g \in [F]^{2m+n}$ which is generated by joining in elements each being 1, n elements each being 0, and in elements each being −1, and the share [σ] are input. Here, F is an arbitrary ring.

The second permutation application units $19_1, \ldots, 19_N$ each generate a share [σ(g)] of a vector σ(g) which is generated by application of the permutation σ to the vector g, using the share [g] of the vector $g \in [F]^{2m+n}$ which is generated by joining in elements each being 1, n elements each being 0, and in elements each being −1, and the share [σ] (step S9).

The share [σ(g)] is output to the third vector generation units $110_1, \ldots, 110_N$.

For example, $g=(1, 1, 1, 0, 0, 0, 0, -1, -1, -1)$ and $\sigma(g)=(1, 0, -1, 1, -1, 0, 1, 0, 0, -1)$ are yielded when m=3 and n=4 hold and the permutation σ is σ defined by the formula (1) below.

$$\sigma = \begin{pmatrix} 3 & 5 & 9 & 3 & 7 & 9 & 9 & 3 & 5 & 9 \\ 3 & 3 & 3 & 5 & 5 & 7 & 9 & 9 & 9 & 9 \end{pmatrix} \quad (1)$$

Here, each sequence $(i, j)^T$ of the permutation σ means that the ith element of the vector to which the permutation is applied is moved to the jth element.

<Step S10>

The share [σ(g)] is input to the third vector generation units $110_1, \ldots, 110_N$.

The third vector generation units $110_1, \ldots, 110_N$ each use the share [σ(g)] to generate a share [σ(g')] of a vector σ(g'), each element of which is the sum of the elements of the vector σ(g) up to the element corresponding to that element, the elements including the element corresponding to that element (step S10). In other words, the third vector generation units $110_1, \ldots, 110_N$ calculate the prefix-sum of σ(g) as σ(g'). When $\sigma(g)_i$ is the ith element of σ(g) and $\sigma(g')_i$ is the ith element of σ(g'), $\sigma(g')_i = \sum_{j=1}^{i} \sigma(g)_j$ is yielded.

The share [σ(g')] is output to the second inverse permutation application units $111_1, \ldots, 111_N$.

For example, $\sigma(g')=(1, 1, 0, 1, 0, 0, 1, 1, 1, 0)$ is yielded when $\sigma(g)=(1, 0, -1, 1, -1, 0, 1, 0, 0, -1)$.

<Step S11>

The share [σ(g')] is input to the second inverse permutation application units $111_1, \ldots, 111_N$.

The second inverse permutation application units $111_1, \ldots, 111_N$ each use the share [σ(g')] and the share [g']

to generate a share [g'] of a vector g' which is generated by application of the inverse permutation $\sigma^{-1}$ of the permutation $\sigma$ to the vector $\sigma(g')$ (step S11).

The share [g'] is output to the second vector extraction units $112_1, \ldots, 112_N$.

For example, g'=(1, 1, 1, 1, 0, 1, 1, 0, 0, 0) is yielded when $\sigma(g')$=(1, 1, 0, 1, 0, 0, 1, 1, 1, 0).

<Step S12>

The share [g'] is input to the second vector extraction units $112_1, \ldots, 112_N$.

The second vector extraction units $112_1, \ldots, 112_N$ each use the share [g'] to generate a share [f1'] of a vector f1' which is generated by extracting the m+1th to m+nth elements of the vector g' (step S12).

The share [f1'] is output to the modified second table generation units $113_1, \ldots, 113_N$.

For example, f1'=(1, 0, 1, 1) is yielded when m=3, n=4, and g'=(1, 1, 1, 1, 0, 1, 1, 0, 0, 0).

<Step S13>

The share [f1'] and the share [y] are input to the modified second table generation units $113_1, \ldots, 113_N$.

The modified second table generation units $113_1, \ldots, 113_N$ each use the share [f1'] and the share [y] to generate a modified second table by joining the vector f1', if f1'$_i$=0 with i=1, . . . , n, and a table having the ith element of the attribute of the second table as $u_{v2}$, and the vector y (step S13). $u_{v2}$ is a predetermined value.

The modified second table is output to the first table joining units $121_1, \ldots, 121_N$.

For example, in a case where the second table consists of the vector of keys, $k_2$=(3, 7, 9, 9), and the vector of the attribute values of the one attribute $v_2$, $v_2$=(water, mix au lait, drug, water), with f1'=(1, 0, 1, 1) and the vector y=(100, −1, 85, 85), the modified second table will be the table shown below. In the modified second table below, if f1'$_i$=0 with i=1, . . . , n, the ith element of the key of the second table is turned into u=−1.

| (A) | | | |
|---|---|---|---|
| f1' | $k_2$ | $v_1$ | $v_2$ |
| 1 | 3 | 100 | water |
| 0 | −1 | −1 | $u_{v2}$ |
| 1 | 9 | 85 | drug |
| 1 | 9 | 85 | water |

<Step S14>

To the third permutation application units $114_1, \ldots, 114_N$, a share [e] of a vector $e \in [F]^{2m+n}$ which is generated by joining m elements each being 1, n elements each being 0, and m elements each being −1, and the share [$\sigma$] are input.

The third permutation application units $114_1, \ldots, 114_N$ each use the share [e] of the vector $e \in [F]^{2m+n}$ and the share [$\sigma$] to generate a share [$\sigma(e)$] of a vector $\sigma(e)$ which is generated by application of the permutation $\sigma$ to the vector e (step S14).

The share [$\sigma(e)$] is output to the fourth vector generation units $115_1, \ldots, 115_N$.

For example, e=(1, 1, 1, 0, 0, 0, 0, −1, −1, −1) and $\sigma(e)$=(1, 0, −1, 1, −1, 0, 1, 0, 0, −1) are yielded when m=3 and n=4 hold and the permutation $\sigma$ is $\sigma$ defined by the formula (1) above.

<Step S15>

The share [$\sigma(e)$] is input to the fourth vector generation units $115_1, \ldots, 115_N$.

The fourth vector generation units $115_1, \ldots, 115_N$ each use the share [$\sigma(e)$] to generate a share [$\sigma(e')$] of a vector $\sigma(e')$, each element of which is the sum of the elements of the vector $\sigma(e)$ up to the element corresponding to that element, the elements including the element corresponding to that element (step S15). In other words, the fourth vector generation units $115_1, \ldots, 115_N$ calculate the prefix-sum of $\sigma(e)$ as $\sigma(e')$.

The share [$\sigma(e')$] is output to the shifting units $116_1, \ldots, 116_N$.

For example, $\sigma(e')$=(1, 1, 0, 1, 0, 0, 1, 1, 1, 0) is yielded when $\sigma(e)$=(1, 0, −1, 1, −1, 0, 1, 0, 0, −1).

<Step S16>

The share [$\sigma(e')$] is input to the shifting units $116_1, \ldots, 116_N$.

The shifting units $116_1, \ldots, 116_N$ each use the share [$\sigma(e')$] to generate a share [$\sigma(e'')$] of a vector $\sigma(e'')$ which is generated by shifting the elements of the vector $\sigma(e)$ by one (step S16). In the case of shifting the elements of the vector $\sigma(e)$ each by one forward (to the left), the last element (the rightmost element) of the vector $\sigma(e'')$ is set to 0, for example. Similarly, in the case of shifting the elements of the vector $\sigma(e)$ each by one backward (to the right), the first element (the leftmost element) of the vector $\sigma(e'')$ is set to 0, for example.

The share [$\sigma(e'')$] is output to the third inverse permutation application units $117_1, \ldots, 117_N$.

For example, the vector $\sigma(e'')$=(1, 0, 1, 0, 0, 1, 1, 1, 0, 0) is yielded when $\sigma(e')$=(1, 1, 0, 1, 0, 0, 1, 1, 1, 0) and the elements are shifted forward (to the left) by one.

<Step S17>

The share [$\sigma(e'')$] and the share [$\sigma$] are input to the third inverse permutation application units $117_1, \ldots, 117_N$.

The third inverse permutation application units $117_1, \ldots, 117_N$ each use the share [$\sigma(e'')$] and the share [$\sigma$] to generate a share [e''] of a vector e'' which is generated by application of the inverse permutation $\sigma^{-1}$ of the permutation $\sigma$ to the vector $\sigma(e'')$ (step S17).

The share [e''] is output to the bit inversion units $118_1, \ldots, 118_N$.

For example, the vector e''=(1, 0, 1, 0, 1, 1, 0, 1, 0, 0) is yielded when the vector $\sigma(e'')$=(1, 0, 1, 0, 0, 1, 1, 1, 0, 0) holds and the permutation $\sigma$ is $\sigma$ defined by the formula (1) above.

<Step S18>

The share [e''] is input to the bit inversion units $118_1, \ldots, 118_N$.

The bit inversion units $118_1, \ldots, 118_N$ each use the share [e''] to generate a share [f] of a vector f which is generated by inverting 0 and 1 of the elements of the vector e'' (step S18).

The share [f] is output to the third vector extraction units $119_1, \ldots, 119_N$.

For example, the vector f=(0, 1, 0, 1, 0, 0, 1, 0, 1, 1) is yielded when the vector e''=(1, 0, 1, 0, 1, 1, 0, 1, 0, 0).

<Step S19>

The share [f] is input to the third vector extraction units $119_1, \ldots, 119_N$.

The third vector extraction units $119_1, \ldots, 119_N$ each use the share [f] to generate a share [f'] of a vector f' which is generated by extracting m elements of the vector f from the left (step S19).

The share [f'] is output to the modified first table generation units $120_1, \ldots, 120_N$.

For example, the vector f'=(0, 1, 0) is yielded when the vector f=(0, 1, 0, 1, 0, 0, 1, 0, 1, 1).

The vector f' represents the positions of records that exist only in the first table. For example, the vector f'=(0, 1, 0) means that the second record of the first table exists only in the first table and is absent in the second table.

<Step S20>

The share [f'], the share [r], and the share [d] are input to the modified first table generation units $120_1, \ldots, 120_N$.

The modified first table generation units $120_1, \ldots, 120_N$ each use the share [f'], the share [r], and the share [d] to generate a modified first table by joining the vector f', the vector f' having the ith element of the key of the first table as $u_k$ if $f'_i=0$ with $i=1, \ldots, m$, a table having the ith element of the attribute of the first table as $u_{v1}$, and a vector with elements being a predefined value $u_{v2}$ indicating null as a vector corresponding to the attribute of the second table, where $f'_i$ is the ith element of the vector f', $r_i$ is the ith element of the vector r, and $u_k$ and $u_{v1}$ are predetermined values (step S20).

The modified first table is output to the first table joining units $121_1, \ldots, 121_N$.

For example, in a case where $u_k$, $u_{v1}=-1$ and the vector f'=(0, 1, 0) hold, the first table has three records and consists of the vector of keys, $k_1=(3, 5, 9)$, and the vector of the attribute values of the one attribute $v_1$, $v_1=(100, 19, 85)$, and $r=k_1$ and $d=v_1$ hold, the modified first table will be the table shown below.

| (B) | | | |
|---|---|---|---|
| f' | $k_1$ | $v_1$ | $v_2$ |
| 0 | −1 | −1 | $u_{v2}$ |
| 1 | 5 | 19 | $u_{v2}$ |
| 0 | 9 | −1 | $u_{v2}$ |

<Step S21>

The modified second table and the modified first table are input to the first table joining units $121_1, \ldots, 121_N$.

The first table joining units $121_1, \ldots, 121_N$ each generate a joined table by joining the modified second table and the modified first table (step S21).

For example, when the modified second table is the one shown in (A) above and the modified first table is the one shown in (B) above, the joined table will be the table shown below. In the joined table below, a vector generated by joining the flag vector f1' and f is represented as f''.

| (c) | | | |
|---|---|---|---|
| f'' | $k_2$ | $v_1$ | $v_2$ |
| 1 | 3 | 100 | water |
| 0 | −1 | −1 | $u_{v2}$ |
| 1 | 9 | 85 | drug |
| 1 | 9 | 85 | water |
| 0 | −1 | −1 | $u_{v2}$ |
| 1 | 5 | 19 | $u_{v2}$ |
| 0 | −1 | −1 | $u_{v2}$ |

<Step S22>

The shares [f1'] and [f'] are input to the first table formatting units $122_1, \ldots, 122_N$.

The first table formatting units $122_1, \ldots, 122_N$ each use the joined table and the shares [f1'] and [f'] to generate a formatted joined table by extracting, from the joined table, records for which the elements of the vector f1' and the vector f' (in other words, the elements of the vector f'' which is generated by joining the vector f1' and the vector f') are 1 (step S22).

For example, when the joined table is the joined table (C) above, the formatted joined table will be the table shown below.

| (C) | | | |
|---|---|---|---|
| f'' | $k_2$ | $v_1$ | $v_2$ |
| 1 | 3 | 100 | water |
| 1 | 9 | 85 | drug |
| 1 | 9 | 85 | water |
| 1 | 5 | 19 | $u_{v2}$ |

Alternatively, the first table formatting units $122_1, \ldots, 122_N$ may generate the formatted joined table by sorting by the vector f'' which is generated by joining the vector f1' and the vector f' and thereafter extracting the records for which the elements of the vector f'' are 1. In this case, the share [f''] of the vector f'' may be released.

This formatted joined table is a left outer join of the first table and the second table.

[Secure Joining System and Method for Performing Right Outer Join]

Referring to FIG. 1, an exemplary configuration of a secure joining system according to an embodiment is described. This secure joining system and method performs so-called right outer join. In other words, this secure joining system joins records that are common to the first table and the second table with records that exist only in the second table while maintaining confidentiality.

The secure joining system for performing right outer join is similar to the secure joining system for performing left outer join except that it includes a modified second table generation unit $123_n$, instead of including the second permutation application unit $19_n$, the third vector generation unit $110_n$, the second inverse permutation application unit $111_n$, the second vector extraction unit $112_n$, the modified second table generation unit $113_n$, the third permutation application unit $114_n$, the fourth vector generation unit $115_n$, the shifting unit $116_n$, the third inverse permutation application unit $117_n$, the bit inversion unit $118_n$, the third vector extraction unit $119_n$, the modified first table generation unit $120_n$, the first table joining unit $121_n$, and the first table formatting unit $122_n$.

The secure joining method for performing right outer join is similar to the secure joining method for performing left outer join except that it performs the processing at step S23 instead of performing the processing at step S9 to step S22.

In the following, differences from the secure joining system and method for performing left outer join are described. The same portions as those of the secure joining system and method for performing left outer join are not described again.

Figure 6:
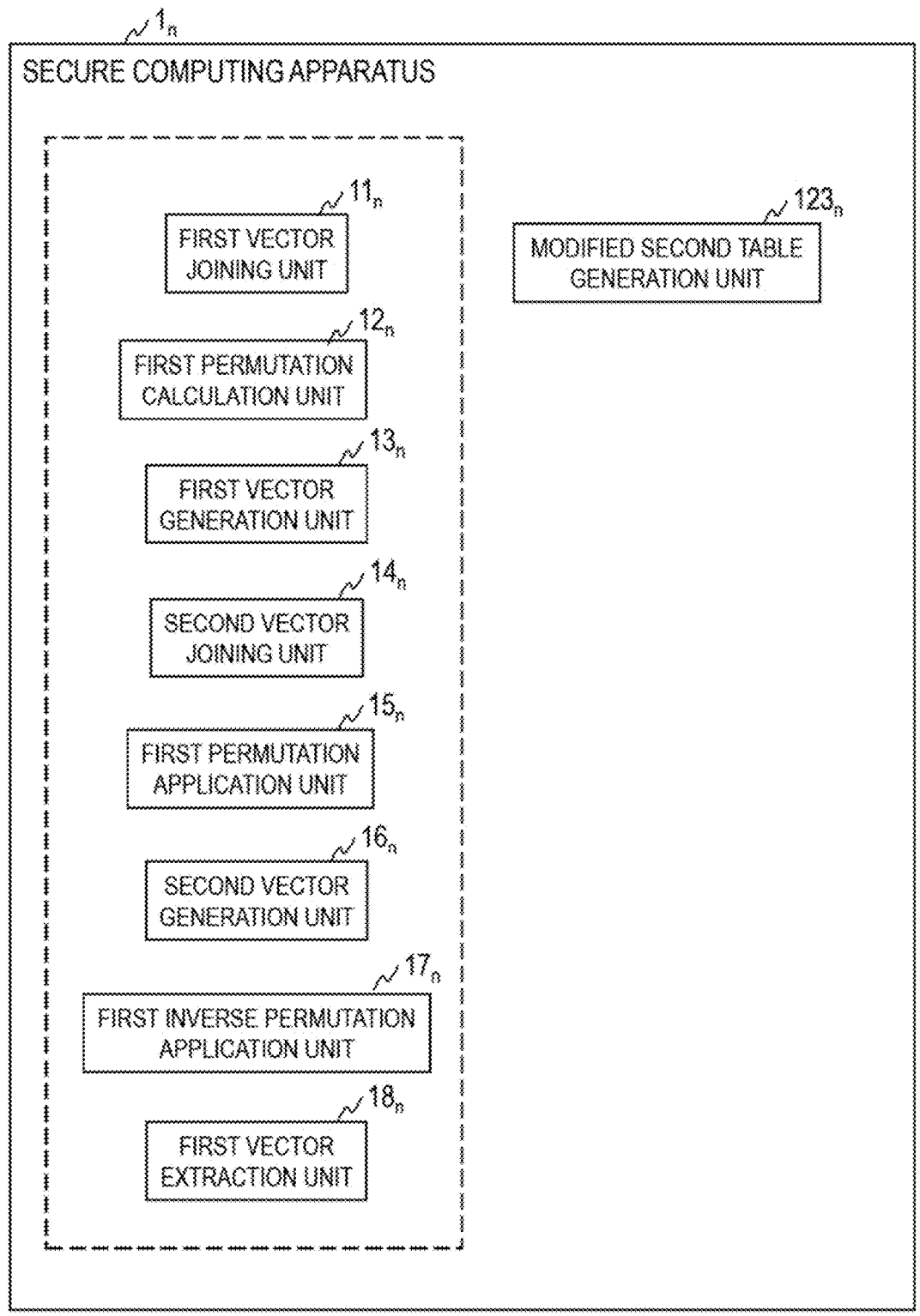
FIG. 6 illustrates a functional configuration of a secure computing apparatus of a secure joining system for performing right outer join.

As shown in FIG. 6, the secure computing apparatus $1_n$ of the secure joining system includes the first vector joining unit $11_n$, the first permutation calculation unit $12_n$, the first vector generation unit $13_n$, the second vector joining unit $14_n$, the first permutation application unit $15_n$, the second vector generation unit $16_n$, the first inverse permutation application unit $17_n$, the first vector extraction unit $18_n$, and the modified second table generation unit $123_n$, for example.

The first vector joining unit $11_n$, the first permutation calculation unit $12_n$, the first vector generation unit $13_n$, the second vector joining unit $14_n$, the first permutation application unit $15_n$, the second vector generation unit $16_n$, the first inverse permutation application unit $17_n$, and the first vector extraction unit $18_n$ of the secure computing apparatus $1_n$, which are enclosed by dashed line in FIG. 6, can be said to be a portion corresponding to the secure strong mapping computing system.

Figure 7:
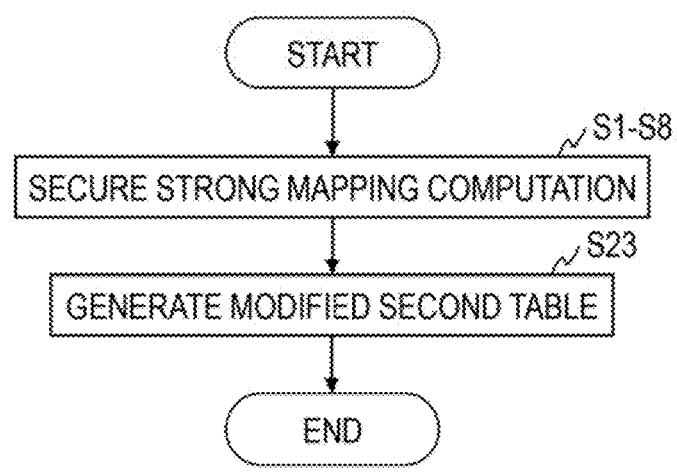
FIG. 7 illustrates a processing procedure of a secure joining method for performing right outer join.

Referring to FIG. 7, the processing procedure of the secure joining method which is performed by the secure joining system in the embodiment is described.

As the processing at <step S1> to <step S8> is similar to the processing at <step S1> to <step S8> described in Section [Secure strong mapping computing system and method], overlapping description is not repeated here.

For example, in the case of the vector $r=k_1=(3, 5, 9)$, the vector $d=v_1=(100, 19, 85)$, $u=-1$, and $x=k_2=(3, 7, 9, 9)$, application of the mapping to the vector $x=(3, 7, 9, 9)$ gives a vector: the vector $y=(100, -1, 85, 85)$. Since the second element "7" of the vector $x=k_2=(3, 7, 9, 9)$ does not exist in the elements of the vector $r=k_1=(3, 5, 9)$, the second element of the vector $y=(100, -1, 85, 85)$ is the outlier $u=-1$. In this manner, the vector y is calculated such that an attribute value corresponding to a record which is a record of the second table and which corresponds to a key that does not exist in the first table will be the outlier u.

<Step S23>

The share [y] is input to the modified second table generation units $123_1, \ldots, 123_N$.

The modified second table generation units $123_1, \ldots, 123_N$ each use the share [y] to generate a modified second table by joining the second table and the vector y (step S23).

For example, in a case where the second table has four records and consists of the vector of keys, $k_2=(3, 7, 9, 9)$, and the vector of the attribute values of the one attribute $v_2$, $v_2=$(water, mix au lait, drug, water), with the vector $y=(100, -1, 85, 85)$, the modified second table will be the table shown below.

| (D) | | |
|---|---|---|
| $k_2$ | $v_1$ | $v_2$ |
| 3 | 100 | water |
| 7 | −1 | mix au lait |
| 9 | 85 | drug |
| 9 | 85 | water |

This modified second table is a right outer join of the first table and the second table.

[Secure Joining System and Method for Performing Full Outer Join]

Figure 8:
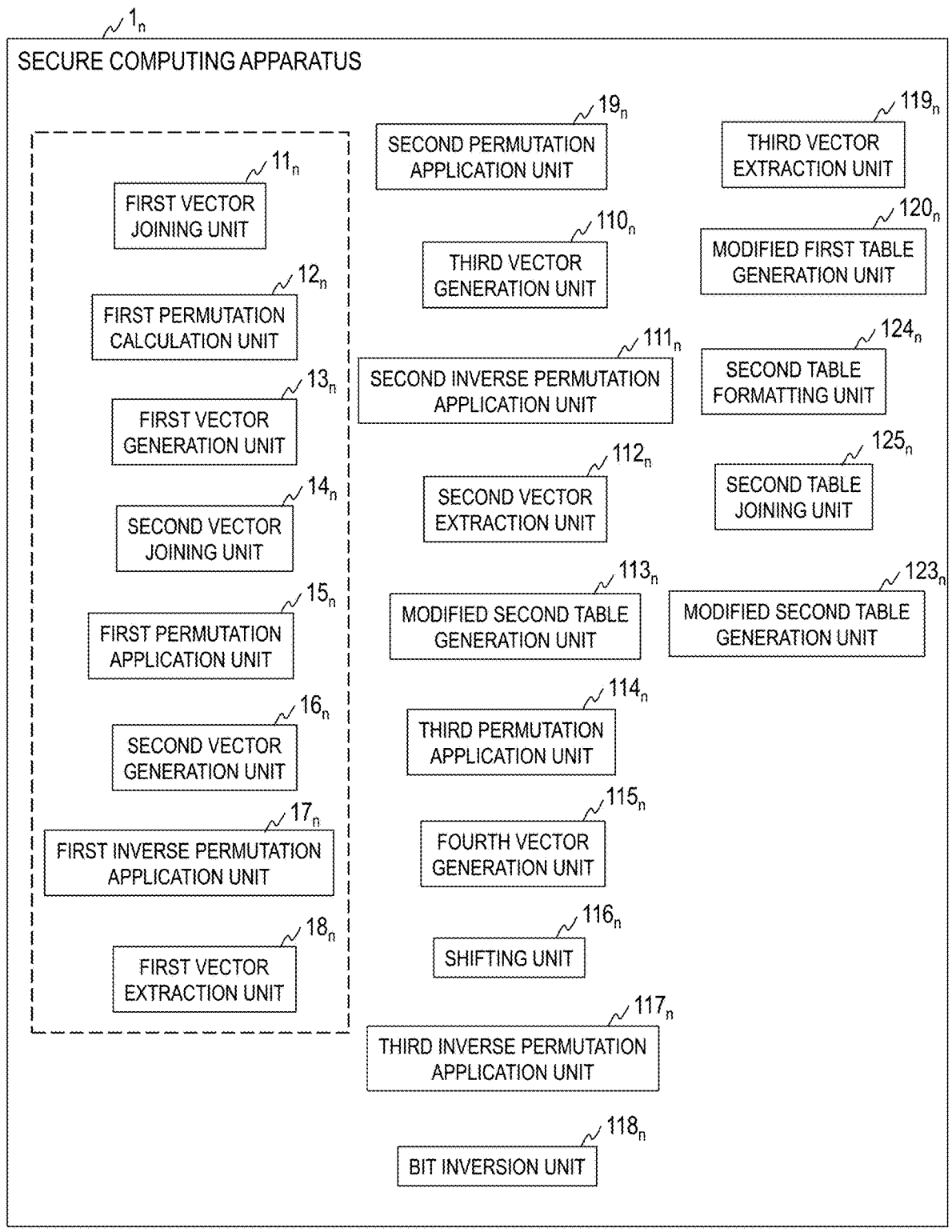
FIG. 8 illustrates a functional configuration of a secure computing apparatus of a secure joining system for performing full outer join.

Referring to FIG. 8, an exemplary configuration of a secure joining system according to an embodiment is described. This secure joining system and method performs so-called full outer join. In other words, this secure joining system joins records that are common to the first table and the second table, records that exist only in the first table, and records that exist only in the second table while maintaining confidentiality.

The secure joining system for performing full outer join is similar to the secure joining system for performing left outer join and the secure joining system for performing right outer join except that it includes a second table formatting unit $124_n$ and a second table joining unit $125_n$, instead of including the first table joining unit $121_n$ and the first table formatting unit $122_n$.

The secure joining method for performing full outer join is similar to the secure joining method for performing left outer join and the secure joining method for performing right outer join except that it performs the processing at steps S24 and S25 instead of performing the processing at step S21 and step S22.

In the following, differences from the secure joining system and method for performing left outer join and the secure joining system and method for performing right outer join are described. The same portions as those of the secure joining system and method for performing left outer join and the secure joining system and method for performing right outer join are not described again.

As shown in FIG. 8, the secure computing apparatus $1_n$ of the secure joining system includes the first vector joining unit $11_n$, the first permutation calculation unit $12_n$, the first vector generation unit $13_n$, the second vector joining unit $14_n$, the first permutation application unit $15_n$, the second vector generation unit $16_n$, the first inverse permutation application unit $17_n$, the first vector extraction unit $18_n$, the second permutation application unit $19_n$, the third vector generation unit $110_n$, the second inverse permutation application unit $111_n$, the second vector extraction unit $112_n$, the modified second table generation unit $113_n$, the third permutation application unit $114_n$, the fourth vector generation unit $115_n$, the shifting unit $116_n$, the third inverse permutation application unit $117_n$, the bit inversion unit $118_n$, the third vector extraction unit $119_n$, the modified first table generation unit $120_n$, the modified second table generation unit $123_n$, the second table formatting unit $124_n$, and the second table joining unit $125_n$, for example.

The first vector joining unit $11_n$, the first permutation calculation unit $12_n$, the first vector generation unit $13_n$, the second vector joining unit $14_n$, the first permutation application unit $15_n$, the second vector generation unit $16_n$, the first inverse permutation application unit $17_n$, and the first vector extraction unit $18_n$ of the secure computing apparatus $1_n$, which are enclosed by dashed line in FIG. 8, can be said to be a portion corresponding to the secure strong mapping computing system.

Figure 9:
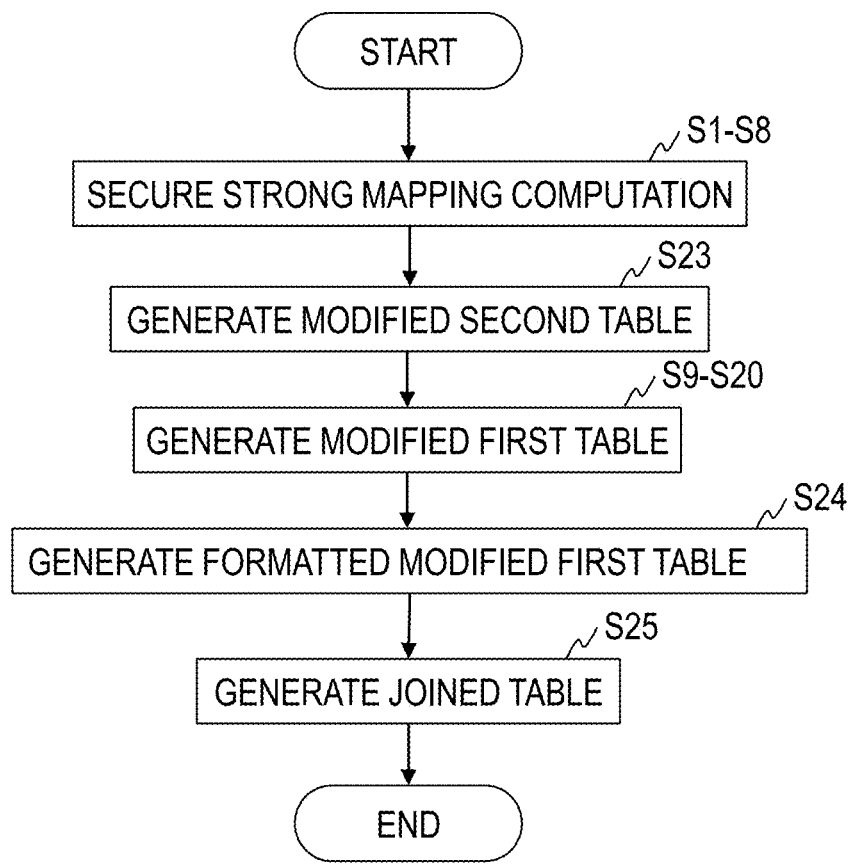
FIG. 9 illustrates a processing procedure of a secure joining method for performing full outer join.

Referring to FIG. 9, the processing procedure of the secure joining method which is performed by the secure joining system in the embodiment is described.

First, processing at <step S1> to <step S8> is performed. As the processing at <step S1> to <step S8> is similar to the processing at <step S1> to <step S8> described in Section [Secure strong mapping computing system and method], overlapping description is not repeated here.

For example, in the case of the vector $r=k_1=(3, 5, 9)$, the vector $d=v_1=(100, 19, 85)$, $u=-1$, and $x=k_2=(3, 7, 9, 9)$, application of the mapping to the vector $x=(3, 7, 9, 9)$ gives a vector: the vector $y=(100, -1, 85, 85)$. Since the second element "7" of the vector $x=k_2=(3, 7, 9, 9)$ does not exist in the elements of the vector $r=k_1=(3, 5, 9)$, the second element of the vector $y=(100, -1, 85, 85)$ is the outlier $u=-1$. In this manner, the vector y is calculated such that an attribute value corresponding to a record which is a record of the second table and which corresponds to a key that does not exist in the first table will be the outlier u.

Next, the processing at <step S23> is performed. As the processing at <step S23> is similar to the processing at <step S23> described in Section [Secure joining system and method for performing right outer join], overlapping description is not repeated here.

For example, in a case where the second table has four records and consists of the vector of keys, $k_2=(3, 7, 9, 9)$, and the vector of the attribute values of the one attribute $v_2$, $v_2$=(water, mix au lait, drug, water), with the vector y=(100, −1, 85, 85), the modified second table will be the table shown below.

| (D) | | |
|---|---|---|
| $k_2$ | $v_1$ | $v_2$ |
| 3 | 100 | water |
| 7 | −1 | mix au lait |
| 9 | 85 | drug |
| 9 | 85 | water |

Next, processing at <step S9> to <step S20> is performed. As the processing at <step S9> to <step S20> is similar to the processing at <step S9> to <step S20> described in Section [Secure joining system and method for performing left outer join], overlapping description is not repeated here.

Next, processing at <step S24> and <step S25> is performed.

<Step S24>

The share [f'] is input to the second table formatting units $124_1, \ldots, 124_N$.

The second table formatting units $124_1, \ldots, 124_N$ each use the modified first table and the share [f'] to generate a formatted modified first table by extracting, from the modified first table, records for which the elements of the vector f' are 1 (step S24).

The formatted modified first table is output to the second table joining units $125_1, \ldots, 125_N$.

For example, when the modified first table is the table (B) above, the formatted modified first table will be the table shown below.

| 5 | 19 | $u_{v2}$ | (E) |
|---|---|---|---|

<Step S25>

The modified second table and the formatted modified first table are input to the second table joining units $125_1, \ldots, 125_N$.

The second table joining units $125_1, \ldots, 125_N$ each generate a joined table by joining the modified second table and the formatted modified first table (step S25).

For example, when the modified second table is the table (D) above and the formatted modified first table is the table (E) above, the joined table will be the table shown below.

| $k_2$ | $v_1$ | $v_2$ |
|---|---|---|
| 3 | 100 | water |
| 7 | −1 | mix au lait |
| 9 | 85 | drug |
| 9 | 85 | water |
| 5 | 19 | $u_{v2}$ |

This table is a full join of the first table and the second table.

MODIFICATIONS

While the embodiments of the present invention have been described, specific configurations are not limited to these embodiments, but design modifications and the like within a range not departing from the spirit of the invention are encompassed in the scope of the invention, of course.

For example, the attribute of a key may be a composite key of z attributes, where z is a positive integer greater than or equal to 2. In this case, the processing at step S1 may be performed in the following manner, for example.

Assume $r_0, \ldots, r_{z-1}$ instead of r. Assume $x_0, \ldots, x_{z-1}$ instead of x.

In this case, the processing at step S1 joins $r_i$ and $x_i$, then again with $r_i$ to obtain $k_i$ for each i (where i=0, ..., z−1). Then, each $k_i$ is turned into a bit representation by bit decomposition and joined horizontally. For example, when $k_0=(1, 2, 3, 1, 3, 0, 1, 1, 2, 3)^T$ and $k_1=(0, 0, 0, 0, 0, 1, 1, 0, 0, 0)^T$, bit decomposition of $k_0$ results in $(k_0)_0=(1, 0, 1, 1, 1, 0, 1, 1, 0, 1)^T$ and $(k_0)_1=(0, 1, 1, 0, 1, 0, 0, 0, 1, 1)^T$.

Here, since $k_0$ assumes a value from 1 to 3, each element of $k_0$ can be represented in 2 bits. $(k_0)_0$ is the lower bit of $k_0$ upon bit decomposition, and $(k_0)_1$ is the upper bit of $k_0$ upon bit decomposition. Since $k_1$ is inherently a 1-bit number in this example, it does not require decomposition and $k_1=(k_1)_0$ is assumed. Horizontal joining of $(k_0)_0$, $(k_0)_1$, and $(k_1)_0$ gives:

$$\begin{pmatrix} 1. & 0. & 1. & 1. & 1. & 0. & 1 \\ 0. & 1. & 1. & 0. & 1. & 0. & 0 \\ 0. & 0. & 0. & 0. & 0. & 1. & 1 \end{pmatrix}^T.$$

Regarding such an arrangement as a matrix and regarding each row of this matrix as a bit representation of the keys of one record, a vector of bit representations of keys, (1, 2, 3, 1, 3, 4, 5, 1, 2, 3), is obtained. This vector can be k which is used at step S2 and after. In this manner, a case with a composite key can also be addressed.

For a composite key, overlap of keys refers to whether keys overlap in terms of combination of the values of the all key attributes and it is assumed that mere overlapping of the values of individual attributes is not regarded as an overlap. For example, a combination of (1, 0) and (1, 1) is not an overlap.

The various processes described in the embodiments may be executed in parallel or separately depending on the processing ability of an apparatus executing the process or on any necessity, rather than being executed in time series in accordance with the described order.

[Program and Recording Medium]

When various types of processing functions in the apparatuses described above are implemented on a computer, the contents of processing function to be contained in each apparatus is written by a program. With this program executed on the computer, various types of processing functions in the above-described apparatuses are implemented on the computer.

This program in which the contents of processing are written can be recorded in a computer-readable recording medium. The computer-readable recording medium may be any medium such as a magnetic recording device, an optical disk, a magneto-optical recording medium, and a semiconductor memory.

Distribution of this program is implemented by sales, transfer, rental, and other transactions of a portable recording medium such as a DVD and a CD-ROM on which the program is recorded, for example. Furthermore, this program may be stored in a storage unit of a server computer and transferred from the server computer to other computers via a network so as to be distributed.

A computer which executes such program first stores the program recorded in a portable recording medium or transferred from a server computer once in a storage unit thereof, for example. When the processing is performed, the computer reads out the program stored in the storage unit thereof and performs processing in accordance with the program thus read out. As another execution form of this program, the computer may directly read out the program from a portable recording medium and perform processing in accordance with the program. Furthermore, each time the program is transferred to the computer from the server computer, the computer may sequentially perform processing in accordance with the received program. Alternatively, a configuration may be adopted in which the transfer of a program to the computer from the server computer is not performed and the above-described processing is executed by so-called application service provider (ASP)-type service by which the processing functions are implemented only by an instruction for execution thereof and result acquisition. It should be noted that a program in this form includes information which is provided for processing performed by electronic calculation equipment and which is equivalent to a program (such as data which is not a direct instruction to the computer but has a property specifying the processing performed by the computer).

In this form, the present apparatus is configured with a predetermined program executed on a computer. However, the present apparatus may be configured with at least part of these processing contents realized in a hardware manner.

What is claimed is:

1. A secure strong mapping computing system comprising:
a plurality of secure computing apparatuses, wherein $F_k$ and $F_v$ are arbitrary rings; $[\alpha]$ is a share generated by secret sharing of $\alpha$, with $\alpha$ being an arbitrary vector or permutation; m and n are predetermined integers greater than or equal to 1; u is a predetermined outlier value; $r \in F_k^m$ is a predetermined vector with elements different from each other; and $d \in F_v^m$ and $x \in F_k^n$ are predetermined vectors, and
the plurality of secure computing apparatuses include processing circuitry and are configured to, in cooperation with each other,
use a share [r] of the vector r and a share [x] of the vector x to generate a share [k] of a vector $k \in [F_k]^{2m+n}$ which is generated by joining the vector r, the vector x, and the same vector as the vector r,
use the share [k] to generate a share $[\sigma]$ of a permutation $\sigma$ for stable sorting of the vector k,
use a share [d] of the vector d and u to generate a share [d'] of a vector d', which is a vector generated by subtracting u from respective elements of the vector d,
use the share [d'] to generate a share [v] of a vector $v \in [F_v]^{2m+n}$ which is generated by joining the vector d', a 0-vector with a number of elements of n, and a vector −d' which is a vector generated by inverting signs of respective elements of the vector d',
use the share [v] and the share $[\sigma]$ to generate a share $[\sigma(v)]$ of a vector $\sigma(v)$ which is generated by application of the permutation $\sigma$ to the vector v,
use the share $[\sigma(v)]$ to generate a share $[\sigma(y)]$ of a vector $\sigma(y)$, each element of which is a sum of the u and a sum of elements of the vector $\sigma(v)$ up to an element corresponding to that element, the elements including the element corresponding to that element,
use the share $[\sigma(y)]$ and the share $[\sigma]$ to generate a share $[\sigma^{-1}(\sigma(y))]$ of a vector $\sigma^{-1}(\sigma(y))$ which is generated by application of an inverse permutation $\sigma^{-1}$ of the permutation $\sigma$ to the vector $\sigma(y)$, and
use the share $[\sigma^{-1}(\sigma(y))]$ to obtain a share [y] of a vector y which is generated by extracting m+1th to m+nth elements of the vector $\sigma^{-1}(\sigma(y))$,
wherein the share [y] includes identification of outliers.

2. A secure computing apparatus of the secure strong mapping computing system according to claim 1.

3. A non-transitory computer readable medium that stores a program for causing a computer to function as the units of the secure computing apparatus according to claim 2.

4. The secure strong mapping computing system according to claim 1, wherein the processing circuitry does not reconstruct shares.

5. The secure strong mapping computing system according to claim 1, wherein the predetermined outlier value u is −1.

6. A secure strong mapping computing method,
where $F_k$ and $F_v$ are arbitrary rings; $[\alpha]$ is a share generated by secret sharing of $\alpha$, with $\alpha$ being an arbitrary vector or permutation; m and n are predetermined integers greater than or equal to 1; u is a predetermined outlier value; $r \in F_k^m$ is a predetermined vector with elements different from each other; and $d \in F_v^m$ and $x \in F_k^n$ are predetermined vectors,
the secure strong mapping computing method comprising:
a first vector joining step performed by a plurality of secure computing apparatuses cooperating with each other and in which a plurality of first vector joining units use a share [r] of the vector r and a share [x] of the vector x to generate a share [k] of a vector $k \in [F_k]^{2m+n}$ which is generated by joining the vector r, the vector x, and the same vector as the vector r;
a first permutation calculation step performed by the plurality of secure computing apparatuses cooperating with each other and in which a plurality of first permutation calculation units use the share [k] to generate a share $[\sigma]$ of a permutation $\sigma$ for stable sorting of the vector k;
a first vector generation step performed by the plurality of secure computing apparatuses cooperating with each other and which a plurality of first vector generation units use a share [d] of the vector d and u to generate a share [d'] of a vector d', which is a vector generated by subtracting u from respective elements of the vector d;
a second vector joining step performed by the plurality of secure computing apparatuses cooperating with each other and in which a plurality of second vector joining units use the share [d'] to generate a share [v] of a vector $v \in [F_v]^{2m+n}$ which is generated by joining the vector d', a 0-vector with a number of elements of n, and a vector −d' which is a vector generated by inverting signs of respective elements of the vector d';
a first permutation application step performed by the plurality of secure computing apparatuses cooperating with each other and in which a plurality of first permutation application units use the share [v] and the share $[\sigma]$ to generate a share $[\sigma(v)]$ of a vector $\sigma(v)$ which is generated by application of the permutation $\sigma$ to the vector v;
a second vector generation step performed by the plurality of secure computing apparatuses cooperating with each other and in which a plurality of second vector generation units use the share $[\sigma(v)]$ to generate a share $[\sigma(y)]$ of a vector $\sigma(y)$, each element of which is a sum of the u and a sum of elements of the vector $\sigma(v)$ up to an element corresponding to that element, the elements including the element corresponding to that element;

a first inverse permutation application step performed by the plurality of secure computing apparatuses cooperating with each other and in which a plurality of first inverse permutation application units use the share [σ(y)] and the share [σ] to generate a share [σ$^{-1}$(σ(y))] of a vector σ$^{-1}$(σ(y)) which is generated by application of an inverse permutation σ$^{-1}$ of the permutation σ to the vector σ(y); and a first vector extraction step performed by the plurality of secure computing apparatuses cooperating with each other and in which a plurality of first vector extraction units use the share [σ$^{-1}$(σ(y))] to obtain a share [y] of a vector y which is generated by extracting m+1th to m+nth elements of the vector σ$^{-1}$(σ(y)), wherein the share [y] includes identification of outliers.

7. The secure strong mapping computing method according to claim 6, wherein each step is performed without reconstructing shares.

8. The secure strong mapping computing method according to claim 6, wherein the predetermined outlier value u is −1.

\* \* \* \* \*